May 25, 1937.   C. Y. CHITTICK   2,081,737
BRAKE BOOSTER FOR AUTOMOTIVE VEHICLES
Filed Sept. 6, 1934   2 Sheets-Sheet 1

Inventor
Charles Y. Chittick
by
Attorney

May 25, 1937. C. Y. CHITTICK 2,081,737
BRAKE BOOSTER FOR AUTOMOTIVE VEHICLES
Filed Sept. 6, 1934 2 Sheets-Sheet 2
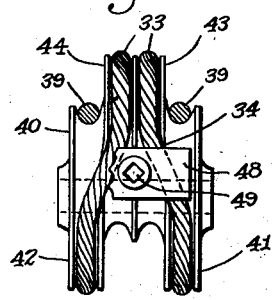
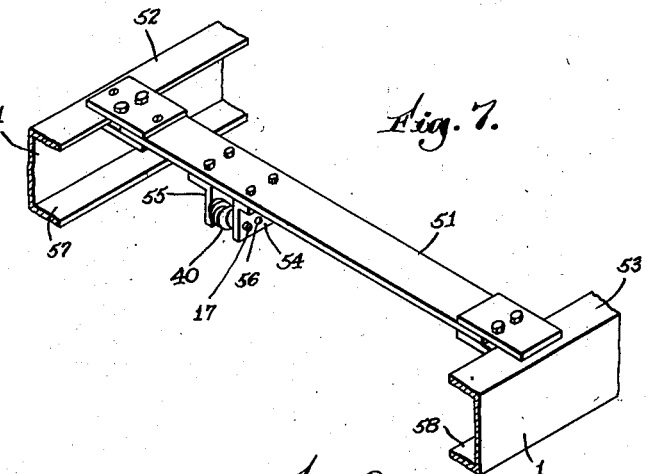
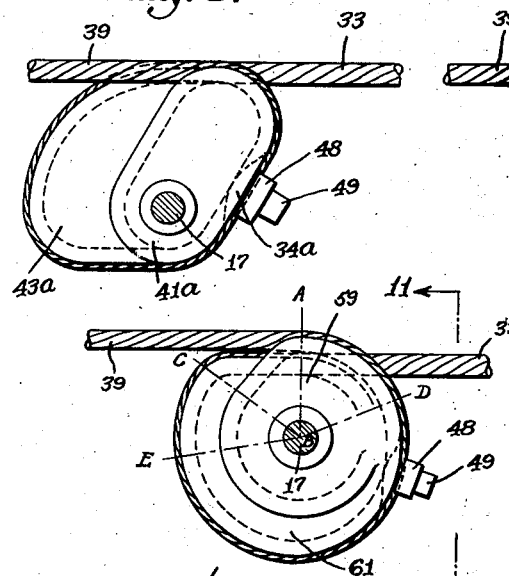
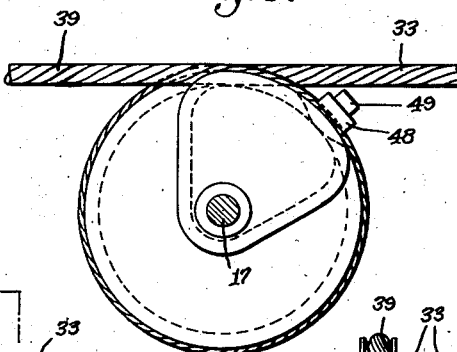
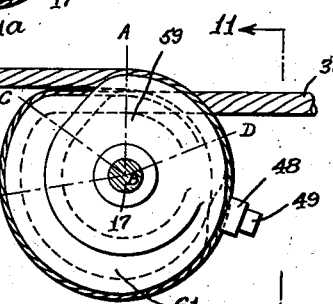
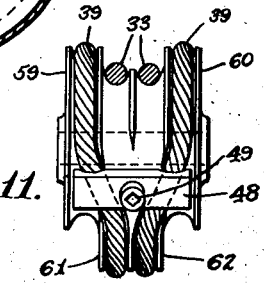
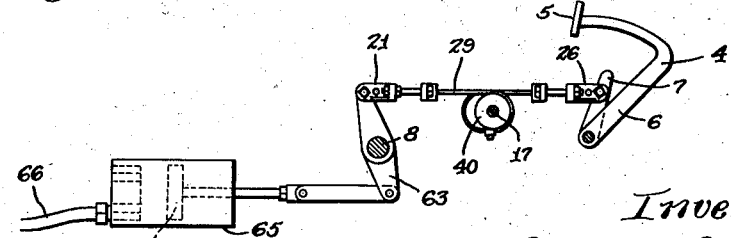
Inventor
Charles Y. Chittick
by
Attorney Patented May 25, 1937

2,081,737

UNITED STATES PATENT OFFICE 2,081,737

BRAKE BOOSTER FOR AUTOMOTIVE VEHICLES

Charles Y. Chittick, Newton Center, Mass., assignor, by mesne assignments, to Anderson Products, Incorporated, a corporation of Massachusetts Application September 6, 1934, Serial No. 742,920

7 Claims. (Cl. 74—517)

This invention relates to braking systems for automotive vehicles.

An object of this invention is to provide a simple, economical device which may be inserted in the braking system of an automobile or truck between the brake pedal and the brake, whereby during part of the stroke of the brake pedal increased leverage may be applied to the brake. Such a device is commonly called a brake "booster".

Another object of the invention is to provide such arrangement of the parts and adjustments that the increased leverage may be applied mainly during the latter part of the stroke of the brake pedal, where the braking effect is most needed.

Another object of my invention is to provide a device which will take up the slack in the braking system with a small movement of the foot pedal, and thereafter progressively increase the leverage up to any desired degree, subsequently holding the leverage at the final desired maximum.

A further object of the invention lies in providing an arrangement of parts and adjustments which may be readily applied to all automobiles and trucks using mechanical or hydraulic braking systems.

Referring now to the drawings,

Fig. 6 is a section on 6—6 of Fig. 5, showing the method of holding the cables in position on the pulleys.

Fig. 7 shows an alternative axle supporting means.

Figs. 8 and 9 show modified pulley designs.

Fig. 10 shows another modification of pulley.

Fig. 11 is a side view of Fig. 10 on 11—11.

Fig. 12 shows my device applied to a hydraulic braking system.

Figure 1:
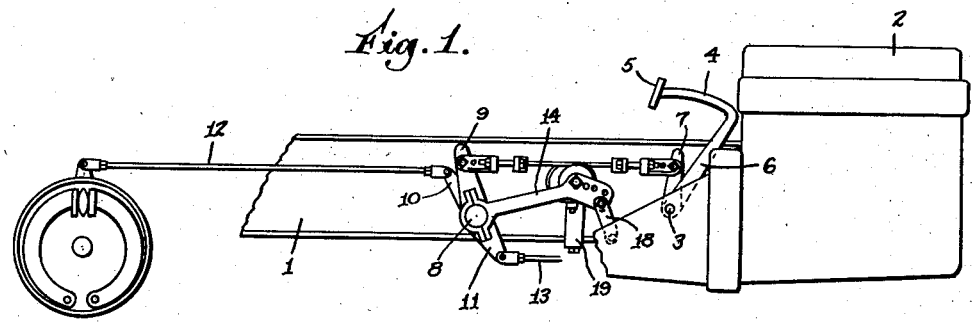
Fig. 1 shows the general location and arrangement of my device when inserted in the braking system of an automobile or truck.

Referring now to Fig. 1, which shows the general location of my device with relation to the braking system and other parts of the vehicle, 1 is the frame and 2 is the engine, on which is supported the shaft 3, having mounted thereon the brake pedal 4, with the foot pad 5, said pedal having a long arm 6 and a short arm 7. Extending between the sides of the frame is the distributor bar 8, having mounted thereon the lever 9. At other positions on the distributor bar 8 are mounted levers 10 and 11. Rod 12 connects lever 10 to the rear brakes and rod 13 connects lever 11 to the front brakes.

It is between lever 9 on the distributor bar and the arm 7 of the brake pedal that my device is ordinarily positioned, although of course it may be inserted at any other convenient or desired position. Ordinarily levers 7 and 9 are connected by a straight rod secured by the customary yoke ends. In place of this rod is my device as shown in detail in Fig. 2.

Mounted on distributor bar 8 are two freely rotatable arms 14 and 15, which are secured in place by caps 16. Extending through and connecting the ends of arms 14 and 15 is the removable shaft or axle 17, secured by a head on one end and a nut threaded on the other. Mounted upon this shaft is a freely rotatable four-track pulley 40 of peculiar design, as will be hereinafter described. Extending downwardly from the arms 14 and 15 are two supports 18 and 19, which are secured respectively to the arms 14 and 15 near the ends of the latter. Support 19 is bolted to the side of the frame and support 18 is bolted to the clutch housing of the engine. Thus, arms 14 and 15 are prevented from rotating on distributor bar 8 and as a consequence shaft 17 is held stationary. It will be observed, however, that since arms 14 and 15 are loosely mounted on bar 8, lever 9 which is secured to bar 8 is free to move with relation to arms 14 and 15. While in my preferred form the supports 18 and 19 extend from the arms 14 and 15 to the engine and frame, they could readily be made to extend to any other part of the frame or body. However whatever arrangement is used must be such as to render shaft 17 stationary. Attached to lever 9 by yoke pin 20 is a yoke 21, having for adjustment purposes the additional pair of holes 22. Extending through holes at either side of the yoke are adjusting screws 23, which are threaded into the side portions of the tunnel clamp 24.

Figure 2:
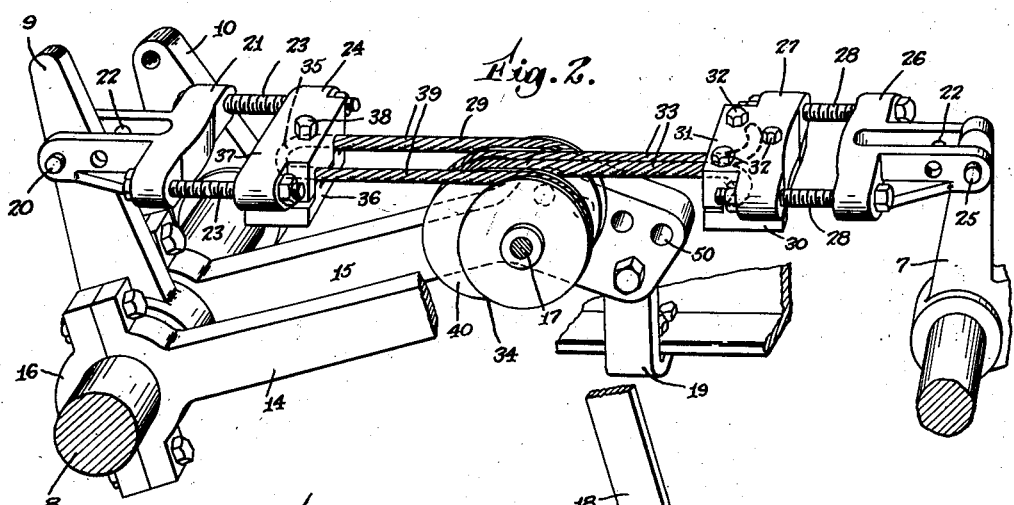
Fig. 2 shows a detailed perspective of my invention.

Attached to the arm 7 of the brake pedal by a yoke pin 25 is a yoke 26 similar to yoke 21, and connecting yoke 26 to the clamp 27 are the adjusting screws 28 threaded into the side portions of clamp 27. Running between clamps 24 and 27 is the flexible steel cable generally referred to as 29, which cable in the preferred form of my invention is one continuous piece. Clamp 27 which holds the ends of the cable is composed of two parts, an upper plate 31, which is integral with the threaded ends, and a lower plate 30, between which parts the ends of the cable are secured, pressure being brought to bear by the bolts 32. In order to eliminate any possibility of the cable ends slipping, the ends are bent away from each other through at least 90 degrees, said ends being positioned in channels in upper plate 31 where they are engaged by corresponding ribs in the lower plate 30. Thus extending toward the rear from clamp 27 are the two portions of cable 33, lying side by side, which pass over the top of the pulley in the two center tracks. When these side-by-side portions of the cable reach the bottom side of the pulley, when the pulley is positioned as shown in Fig. 2, they cross over to the outer tracks at 34, as shown in Fig. 6, and then travel upwardly around the outer tracks and then rearwardly to the clamp 24, through which the bight of the cable passes in a tunnel, 35. This tunnel is effected by the engagement of a channeled upper plate 36, which is integral with the side portions of the clamp, and a lower plate 37, these plates being secured by a bolt 38. The rear portions of the cable between the pulley and the clamp 24 will be referred to hereinafter as parts 39.

Figure 3:
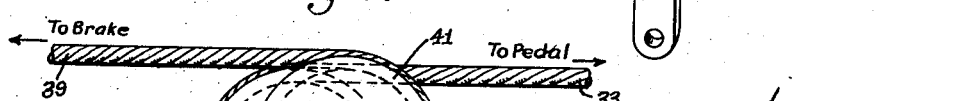
Fig. 3 shows the position of the cable and pulley with the brakes off, the leverage ratio being less than 1 to 1.
Figure 4:
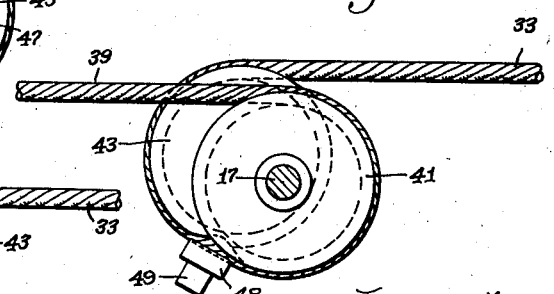
Fig. 4 shows the position of the cable and pulley with the brakes partially on, the leverage now being greater than 1 to 1.
Figure 5:
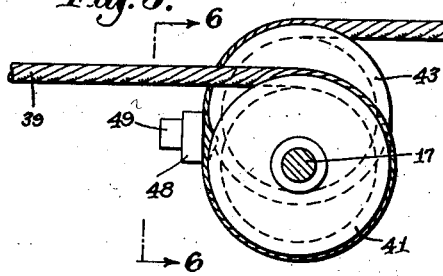
Fig. 5 shows the position of the cable and pulley with the brakes fully on, the maximum leverage having been reached.

Attention is now called to the particular construction of the pulley 40. As shown in Fig. 2 and Fig. 6, this pulley has four tracks, the two outer tracks of the pulley being identical and denoted by the numerals 41 and 42, and the two inner tracks of the pulley being identical and denoted by the numerals 43 and 44. In my preferred form the four tracks constituting the pulley are made integral, but if desired they may be made separately or in pairs and secured together by any suitable means. In the form shown in Figs. 1 to 6 in side view, the outer tracks are circular and the inner tracks are circular, but the centers of the outer and inner tracks do not coincide. The center of the outer tracks is at 45 as shown in Fig. 3 and the center of the inner tracks is at 46. The shaft 17 on which this pulley is mounted passes through a hole 47, the center of which is in this instance at 45, although the hole 47 may be positioned elsewhere to vary the leverage as desired. Thus as the pulley rotates the vertical distance from 45 to the circumference of the outer track remains constant, whereas the vertical distance from 45 to the circumference of the inner track varies. Hence the effective lever arms of the outer tracks on which the rear cable portions 39 operate remain constant, but the effective lever arms of the inner tracks on which the forward cable portions 33 operate vary as the pulley is rotated. Thus when the pulley is in the position shown in Figure 3 the effective lever arm of the outer tracks 41, 42 is greater than the effective lever arms 43, 44 of the inner tracks; but in Fig. 4 when the pulley has rotated slightly to the right the effective lever arm of the inner tracks 43, 44 is greater than the effective lever arms of the outer tracks 41, 42, thus developing a mechanical advantage. In Fig. 5 the position of the tracks is such as to give the maximum mechanical advantage possible with this particular pulley design.

It is obvious from the foregoing that pulleys of various shapes may be designed to give any desired ratios of mechanical advantages. Likewise the ratios may be varied by shifting the position of the axis about which the pulley rotates.

Since it is essential that cable 29 must not slip on the pulley 40, means is provided as shown in Figs. 3 to 6 to hold the cable securely in position. A clip 48 located at the point where the cable crosses from the outer tracks to the inner tracks is provided to hold the cable in a fixed position relative to the pulley, the clip in turn secured by a bolt 49. The adjusting screws 23 and 28 provide means to set the pulley at the proper initial starting position when the brakes are off and also enable slack in the system to be taken up. In case it is necessary to adjust the position of the axle 17 several holes 50 are provided in the outer ends of the arms 14 and 15, whereby the position of the axle 17 may be shifted at will. Further adjustments are to be found in the yokes 21 and 26 in the form of two sets of holes 22. Further adjustments in the system can be made by varying the distance between the clamps 24 and 27 by the simple expedient of changing the position of clamp 27 with reference to the cable portions 33.

In certain vehicles it may not be possible to support the axle 17 by means of the arms 14 and 15, due to interference on the distributor bar 8 or for other reasons. I have, therefore, provided an alternative supporting means for the axle 17, one form of which is shown in Fig. 7. This form of support consists of a cross bar 51 of any suitable cross section which extends from the upper flange 52 of one side of the frame 1 to upper flange 53 of the other side of the frame 1. This cross bar 51 may be secured to the flanges by clamps or by welding or otherwise. Depending from the bar 51 are the supporting arms 54 and 55, having therein the several sets of holes 56, any one set of which are adapted to support the axle 17. It is apparent that such an arrangement will provide ample support for the axle 17 and the pulley 40 mounted thereon as the brake is operated.

When the brake is fully applied, as shown in Fig. 5, there is a considerable force exerted on axle 17 in the direction of the distributor bar, and the supporting means for the axle must therefore be of sufficient strength and rigidity to hold the axle substantially stationary with reference to the frame. The supporting means that I have shown in Figs. 2 and 7 have been found adequate to hold axle 17 in position.

There is one feature, however, about the supporting means shown in Fig. 7 that is not present in the supporting means shown in Fig. 2. Since bar 51 is ordinarily not over ¼″ in thickness it is apparent that when a rearward force is applied to axle 17 as it is supported by the arms 54 and 55, there will be a slight twisting action in bar 51, and as a consequence axle 17 can move a small distance in the direction of the distributor bar 8. By properly adjusting the torsional resistance of bar 51 to the force that is to be applied to the brakes the amount of movement of axle 17 can be accurately controlled, and this springlike movement forward and backward of the axle 17 softens or cushions the foot pedal action, which is desirable from the driver's standpoint. This slight axle movement, however, in no way affects the efficiency of the system, although it does permit a very small increase in the downward movement of the foot pedal, which increase is necessary, as a result of the cushioning action of the bar 51.

It is apparent that my supporting bar 51 could also be held in position between the lower flanges 57 and 58 of the frame 1, as well as in the manner shown in Fig. 7. When the bar 51 is held between the lower flanges the arms 54 and 55 extend upwardly instead of downwardly.

Figs. 8 and 9 show two modified forms of pulleys in which no quick take-up is provided. In Fig. 8 is shown a pulley having four tracks, the outer tracks designated as 41a, the inner tracks designated as 43a. The outer tracks carry the cable portions 39 around to the part of the pulley designated as 34a, at which point the cables cross over to the inside tracks in the same manner as shown in Fig. 6. The cables are clamped to the pulley by clip 48 and cap screw 49. The cables then pass upwardly around the inside tracks 43a, portions 33 of the cables leaving the pulley for connection with the foot pedal. If the pulley is rotated to the left, the effective lever arms of cable portions 33 and 39 remain equal. If the pulley is rotated to the right, the effective lever arm of cable portion 33 increases with respect to the effective lever arm of cable portion 39. By this pulley construction, the lever ratio between cable portions 33 and 39 is never less than one to one.

Fig. 9 shows a pulley in general the same as the pulley in Fig. 8, differing only in the particular configuration of the inner and outer tracks, which differences are apparent on inspection.

In Figs. 10 and 11, I have shown an alternative form of pulley construction which gives particularly desirable results. This pulley is composed of the outer tracks 59 and 60 and the inner tracks 61 and 62. The outer tracks carry the cable portions that run to the distributor bar and the inner tracks the cable portions that go to the brake pedal. The shape of these tracks is such that during the quick take-up portion of the movement of the pulley indicated by the angle ABD the ratio of movement of the cables is constant. Then during a turning movement of about 45°, as indicated by the angle ABC, the leverage changes from a minimum to a maximum and thereafter a constant maximum leverage is maintained through any subsequent angle of turning, as CBE. The result obtained by this pulley is very desirable, for by maintaining a constant maximum leverage the foot pedal pressure that must be maintained by the driver of the vehicle more nearly approximates the conditions that prevailed before the installation of my device, but the braking effect is increased in proportion to the increased leverage which this arrangement obviously provides.

Other mechanical type boosters operating on a system of levers have provided leverage which constantly increased as the foot pedal was depressed, reaching infinity in some instances. This arrangement often resulted in the operator inadvertently exerting such force on the levers in various parts of the braking system that they were bent or in some cases actually broken. The pulley design shown in the drawings effectually eliminates the possibility of overloading the braking system, as the leverage can not go beyond a predetermined maximum.

My device may also be adapted for use with hydraulically operated brakes, for example as shown by Fig. 12. In this figure a lever 63 attached to yoke 21 operates the piston 64 of the cylinder 65, which cylinder contains the oil that flows through the pipe 66 to operate the brakes.

The operation of the brake is as follows. As the operator starts to depress the pedal the pulley is in the approximate position shown by Fig. 3. The slack in the system is quickly taken up without undue effort on the operator's part, since the resistance on the brake side of the pulley is slight in the early stages of the application of the brake. As the pedal is further depressed and the pulley reaches the position shown in Fig. 4, the slack has been removed from the system and the brakes are in the early stages of effectiveness. At this point the available leverage is greater than one to one, and from then on the leverage increases until a maximum is reached and the brakes produce their maximum result. Thus for the same pedal pressure the driver gets a braking effect greater in proportion to his increased leverage as provided by the pulley 40.

The rate of quick take-up and the maximum leverage can be varied at will by changing the shape of the pulley 40, variations of which are shown in Figs. 8, 9, 10, 11 heretofore referred to. Upon releasing the foot pedal pressure the usual springs attached to the braking system retract the cable and pulley to their original positions.

I believe that the arrangement of the parts as shown in the drawings and described heretofore provides a new combination of parts which produces a result not heretofore obtainable, and I desire to claim my invention as broadly as possible, being limited only by the appended claims.

I claim:

1. A brake booster for insertion in a vehicle braking system between the prime mover and the brakes comprising a rotatably mounted four track pulley, a doubled one piece cable wrapped once around and running in the tracks of said pulley and attached thereto, said cable being held at its ends and at its bight between said prime mover and said brakes.

2. A brake booster for insertion in a braking system having a prime mover and a distributor bar with a lever thereon, comprising a rotatable eccentric pulley, means mounted on said distributor bar for supporting said pulley, a one piece doubled cable wrapped about said pulley, the ends of said doubled cable connected with said prime mover and the bight of said doubled cable connected with said lever, said cable capable of rotating said pulley when moved by said prime mover to vary the effective leverage of the system.

3. In a braking system of a vehicle having a frame, a prime mover and a distributor bar with a lever thereon, a booster comprising a four track rotatable eccentric pulley, mounted for rotation on the frame, the outside tracks being of the same configuration, the inner tracks being of the same configuration, a one piece doubled cable having its ends connected side by side to the prime mover, the side by side portions of the cable running partially around said inner tracks, said portions then crossing from the inner tracks to said outer tracks, and running therearound to complete one circuit of the pulley, said cable then connected at its bight to the lever on the distributor bar, the outer and inner tracks being so disposed with reference to the axis of rotation that the effective lever arms provided by the outer and inner tracks for the cable running thereover are varied as the pulley is rotated by the prime mover.

4. A brake booster for insertion in automotive braking systems, comprising a rotatable pulley with eccentrically disposed tracks, a cable from one track connected to the brake pedal, a cable from another track connected to the brakes, a support for said pulley comprising a bar extending from one side of the vehicle frame to the other and connected thereto, arms mounted on said bar to carry the axle of said pulley, the bar being sufficiently flexible to permit appreciable rearward movement of the pulley axle as the brake pedal is moved from off to on position.

5. A brake booster for insertion in a vehicle braking system, comprising a one piece doubled cable wrapped once around a pulley, the ends of said cable secured by a clamp connected to the foot pedal, the bight of said cable connected to the brakes, said connections including two adjusting screws at the pedal end and at the brake end of the booster, said adjusting screws being substantially parallel to each other and having their axes spaced at a distance greater than the distance between the halves of the doubled cable.

6. A brake booster for insertion in a vehicle braking system comprising a four track pulley, a doubled cable having front and rear portions, said cable connected in the system and wrapped around said pulley, one pair of cable portions leaving the pulley from adjacent tracks, the other pair of cable portions leaving the pulley from tracks having said adjacent tracks therebetween.

7. A brake booster for vehicle braking systems comprising a cable operated leverage changing mechanism, including a pulley, said pulley supported by resilient means capable of permitting the pulley axis to shift appreciably in a horizontal direction as the brake is applied, said resilient means being associated with said vehicle and substantially immovable relative thereto.

CHARLES Y. CHITTICK.